United States Patent Office 3,836,601
Patented Sept. 17, 1974

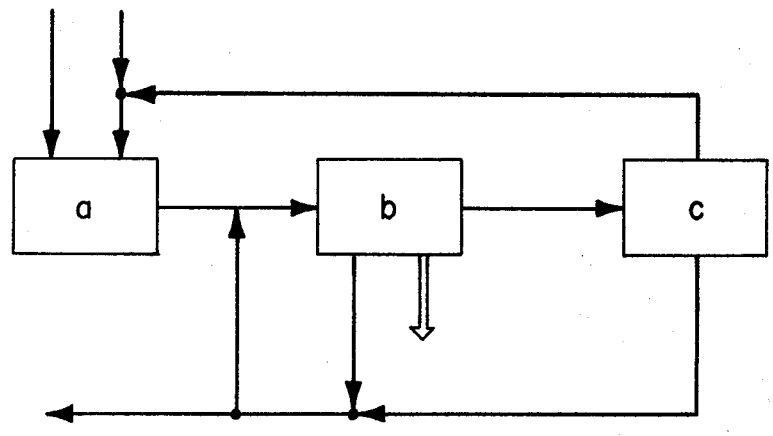
FIG. 1.1
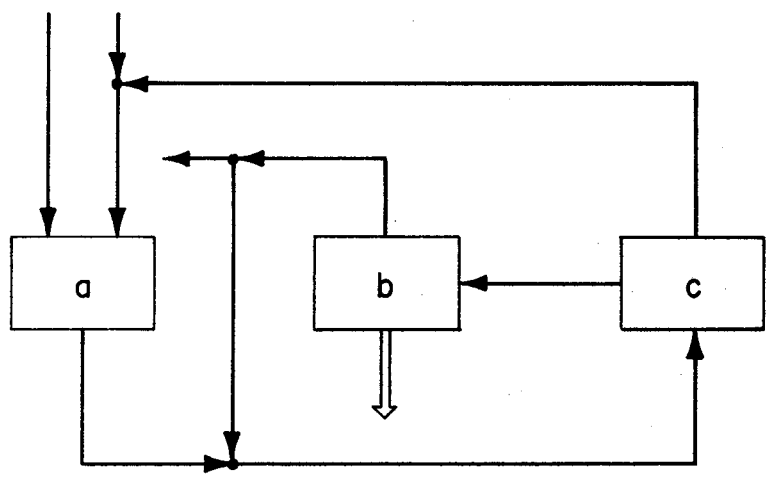
FIG. 1.2

3,836,601
NITRATION PROCESS
Walter Frey, Muttenz, Basel-Land, and William Yarborough, Binningen, Basel-Land, Switzerland, assignors to Sandoz Ltd., Basel, Switzerland
Filed Apr. 25, 1972, Ser. No. 247,425
Claims priority, application Switzerland, Apr. 30, 1971, 6,387/71
Int. Cl. C07c 79/10, 79/36
U.S. Cl. 260—369         19 Claims

ABSTRACT OF THE DISCLOSURE

Disclosed is a nitration process in which the starting material, e.g. anthraquinone, is nitrated using concentrated nitric acid and in which the rate of reaction is reduced by the addition of dilute nitric acid, the amounts of concentrated and dilute acids used being such that the concentration of nitric acid in the resulting residual acid solution is greater than at the azeotropic point of said solution, the solution subsequently being fractionated to yield a concentrated nitric acid fraction and a dilute nitric acid fraction, which fractions can conveniently be recycled, the former to nitrate further starting material, the latter to reduce the rate of nitration of the further starting material.

---

The invention relates to nitration processes of the kind which are carried out in excess nitric acid, in which water is produced and in which the rate of reaction can be reduced by the addition of water.

In processes of this kind, for example in the nitration of anthraquinone, substantial quantities of dilute nitric acid are formed. If this diluted acid is to be concentrated to yield acid of sufficient strength for use in further nitration, the use of time, plant capacity and power is necessitated. Also, constant boiling solutions may be obtained from which it is difficult to obtain concentrated acid.

The present invention seeks to provide a nitration process of the kind above described in which, after completion of the nitration process, concentrated nitric acid can be recovered relatively easily for use, for example, in a further nitration process. Moreover, the invention seeks to provide a nitration process in which a nitric acid cycle can easily be set up.

Thus, according to the present invention there is provided a nitration process of the kind which is carried out in excess nitric acid, in which water is produced and in which the rate of reaction can be reduced by the addition of water, characterized by using concentrated nitric acid to effect nitration and adding dilute nitric acid to reduce the rate of reaction, the amounts of concentrated and dilute nitric acid used being such that the nitric acid concentration of the residual acid solution is greater than at the azeotropic point of said solution, the residual acid solution subsequently being fractionated into a concentrated nitric acid fraction and a dilute nitric acid fraction.

The residual acid solution may contain or may be free from the nitration product, unnitrated starting material or by-products. Where the solution is free from such materials, for example where they are insoluble or have been removed, the solution is composed of water and nitric acid and the concentration of the nitric acid at the azeotropic point thereof is, of course, that at the azeotropic point of a nitric acid/water mixture, i.e. approximately 68%. As will be appreciated, however, where the residual acid solution contains a third component, in addition to water and nitric acid, such component may affect the azeotropic point of the solution. Since, however, in the process of the invention, excess nitric acid is employed, the affect of any third component is generally of small magnitude.

The concentrated nitric acid fractionated from the residual acid solution may be used in a further nitration process. Similarly, the dilute nitric acid may be used for reducting the rate of a further nitration reaction.

In a preferred embodiment of the invention, the nitration process is carried out continuously, the concentrated and dilute nitric acids being recycled, the former being used to nitrate further starting material, the latter to reduce the rate of the nitration process. If such a process is carried out using a nitric acid cycle, the nitric acid concentration of the residual acid solution is preferably maintained at a constant level whereby, upon fractionation, constant amounts of concentrated and dilute acid are obtained. As will be appreciated, in such a cycle, nitric acid is constantly being used up, either as loss or in the nitration process. Moreover, water is constantly being produced in the reaction. Accordingly, amounts of concentrated nitric acid, corresponding to the amounts used up, are preferably added to the cycle, and water, for example in the form of dilute acid or as moisture in the nitration product, is preferably removed therefrom.

The dilute acid preferably is of a concentration at least equal to that at the azeotropic point of the residual acid solution.

The concentrated nitric acid is preferably of at least 90% strength, more preferably of at least 93% strength and most preferably of at least 97% strength. The dilute nitric acid preferably has a nitric acid content of from 70 to 80%. The amounts of concentrated and dilute nitric acids used are preferably such that the concentration of nitric acid in the residual acid solution is from 75 to 90%.

In the process of the invention, the nitration product may be isolated first and the residual nitric acid then fractionated into concentrated and dilute fractions or, alternatively, the concentrated nitric acid may be fractionated from the reaction mixture, the remaining mixture then being separated into nitration product and dilute nitric acid. This latter method has particular application in cases where the nitration product, whilst being insolube or sparingly soluble in dilute nitric acid, is soluble at least to some extent in the more concentrated acid (mixture of dilute and concentrated acid), since, when concentrated nitric acid is removed by fractionation, the nitration product or further nitration product is precipitated from the dilute acid remaining. This is the case in the nitration of anthraquinone.

The process of the invention is especially suitable for the nitration of compounds whose nitration derivatives are insoluble or sparingly soluble in the mixture of concentrated and dilute nitric acid. Examples of such compounds include pyrene, benzanthrone and, in particular, anthraquinone. The process may be used for the synthesis of mononitro or, as desired, polynitro derivatives.

The fractionation into concentrated and dilute nitric acids may be carried out under reduced pressure. As will be appreciated, the reduced pressure may affect the azeotropic point of the residual acid solution. If fractionation is carried out under reduced pressure, then the concentration of nitric acid in the residual acid solution is controlled to lie above that at the azeotropic point of the solution when under the particular pressure used in the fractionation.

Normal methods of fractionation, e.g., distillation, may be employed.

Of particular interest is the use of the process of the invention in the nitration of anthraquinones to yield mononitro anthraquinone. For such nitration of anthraquinone, the mol ratio of concentrated nitric acid to anthraquinone is preferably in the limits of from 20 to 120:1, and the temperature during nitration is preferably in the range of −10° to +60° C. A suitable reaction time is from 10 to 30 minutes, i.e. the anthraquinone is allowed to react with the concentrated acid for this period before the dilute nitric acid is added.

Thus, according to a particular aspect of the invention, there is provided a continuous process for the mononitration of anthraquinone, comprising reacting anthraquinone with nitric acid of at least 90% concentration for a period of from 10 to 30 minutes and at a temperature of from $-10°$ to $+60°$ C., the mole ratio of said nitric acid to the anthraquinone lying in the range of from 20:1 to 120:1, the rate of nitration being reduced after this period by the addition of nitric acid of a concentration of from 70 to 80%, the amounts of concentrated and dilute acids being such that the concentration of nitric acid in the resulting residual acid solution is from 75% to 90%, said residual acid solution being fractionated to yield one fraction of nitric acid of concentration of at least 90% and a further fraction of nitric acid of concentration of from 70 to 80%, the former being used to nitrate further anthraquinone and the latter being used to reduce the rate of reaction of the further nitration process.

The invention also provides apparatus for performing the nitration process, said apparatus comprising a reaction unit of the type permitting continuous operation, a fractionation unit, means for leading residual acid solution to the fractionation unit for fractionation, means for leading the fraction of concentrated nitric acid from said fractionation unit to said reaction unit and means for leading the fraction of dilute nitric acid from the fractionation unit to a point intermediate the reaction unit and the fractionation unit.

The reaction unit may, for example, be a reaction cascade or a reaction tube.

The fractionation unit may, for example, be a rectification or distillation column.

The invention will be further described with reference to the accompanying drawings in which, FIG. 1.1 is a flow diagram of one method of performing the invention.

FIG. 1.2 is a flow diagram of a second method of performing the invention.

Figure 2:
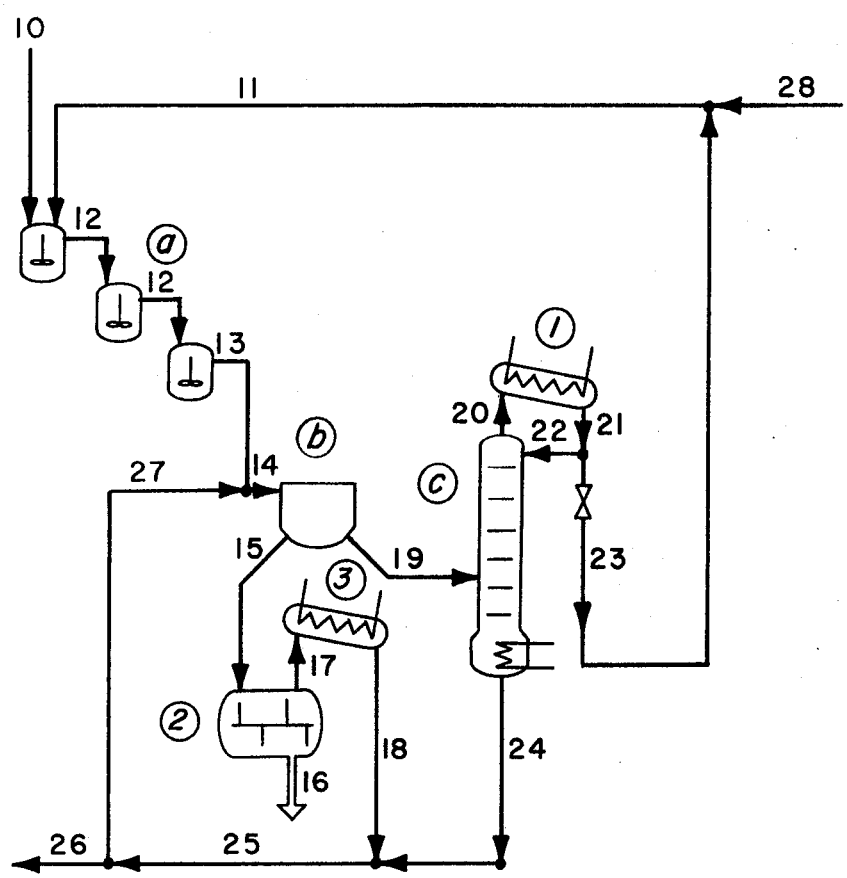
FIG. 2 is a diagrammatic representation of a first apparatus for performing the invention.

Referring to FIGS. 1.1 and 1.2, $a$ represents a nitration unit, $b$ a separation unit and $c$ a rectification unit, which units may be connected to each other by way of condensers.

The nitration unit $a$ may be of any desired type of nitration equipment, preferably of a design permitting continuous operation, for example a reaction cascade or a reactor tube. The design should be such that the dwell time of reagents in the equipment is less than 2 hours, preferably from 5 to 60 minutes.

The separation unit $b$ may be any equipment suitable for the separation of different phases. It may be a filter apparatus, for example a centrifuge, or an evaporator, or a combination of the two. If the unit $b$ is a filter, in particular a centrifuge, it may conveniently be coupled to a crystallization unit.

The rectification unit $c$ is preferably a distillation/rectification apparatus in which distillation can be carried out at normal or reduced pressure. Unit $c$ is preferably a rectification column with several plates.

Referring to FIG. 1.1, the material for nitration, for example anthraquinone, is entered into the nitration unit $a$ together with the amount of nitric acid required for nitration. Dilute nitric acid is added before the reaction mixture reaches the separating unit $b$. In the latter unit the nitration product is separated from the mother lye (residual acid) and, after optional further purification, is led out in the direction shown by the broad arrow.

The mother lye then passes into the rectifying unit $c$, where it is separated into two fractions: a concentrated fraction, which after addition of fresh concentrated acid is returned to $a$ and used for further nitration, and a more dilute fraction which is returned to the reaction mixture at a point between $a$ and $b$. If the nitration product has been purified, acid e.g. from the wash, may be added to the dilute fraction. From the dilute fraction an amount is taken corresponding to the water of reaction (this acid can of course be concentrated in known manner and recycled).

Referring now to FIG. 1.2, the substance for nitration is entered into the nitration unit $a$ together with the amount of concentrated nitric acid required for nitration. The nitration mixture is conducted from $a$ to $c$, dilute nitric acid being added before the mixture reaches $c$. In the separating unit $c$ highly concentrated nitric acid is separated from the reaction mixture and after addition of fresh concentrated acid, is returned to $a$. The remaining reaction mixture is led from $c$ to the separating unit $b$, in which the nitration product, after optional intermediate purification, is removed. The dilute acid remaining, if desired after separation of residual nitration product, is returned to the reaction mixture at a point between $a$ and $c$. The water of reaction is removed from the system.

If the products for nitration and/or the nitrated products are not soluble in the nitration mixture, the reaction is preferably carried out with turbulent flow of the mixture. This can be accomplished, for example, by reacting in a cascade which comprises several, preferably 2 to 10, elements and which is fitted with stirrers, or in a reactor tube in which a flow of liquid is generated which is definable by a Reynolds number of at least 2300.

The rectifying unit $c$ is preferably a column fitted with plates, in which the mixture is fractionated by distillation, preferably vacuum distillation, into a top fraction consisting of concentrated nitric acid and a bottom fraction which, depending on the apparatus (FIG. 1.1 or 1.2), consists of dilute nitric acid or residual reaction mixture.

Referring now to FIG. 2 of the drawings, material for nitration, e.g. anthraquinone, is conducted into a reaction cascade $a$ through inlet 10 and the amount of concentrated (preferably at least 93%) nitric acid required for nitration, (optimally more than 20 equivalents) is admitted through inlet 11. The mixture is conveyed through the cascade by pipe 12, then is led through pipe 13 to be fed with dilute (preferably 70–80%) nitric acid from pipe 27 and on through pipe 14 to a separating unit $b$. Unit $b$ is preferably an evaporator in which the solid nitration product (nitroanthraquinone) is separated from the residual nitric acid. The solid nitration product is conveyed through pipe 15 to a thin-layered drier 2, while the aqueous, vaporous nitric acid passes through pipe 19 into rectifying column $c$. In the thin-layer drier 2 the nitration product is separated from the remaining nitric acid. This acid is recycled through pipe 17, condenser 3 and pipe 18, while the nitration product is collected in a receiver 16. The rectifying column $c$ is preferably maintained under reduced pressure and the aqueous nitric acid is fed into it through pipe 19 to be separated into a top and a bottom fraction. The top fraction consists of highly concentrated nitric acid (advantageously of at least 93%, preferably of more than 98% strength). This acid is led out through the pipe 20 into a condenser 1 and then out through pipe 21. A part of the acid is returned through pipe 22 to the rectifying column for use in refluxing, while the remainder is conveyed through pipe 23, together with fresh highly concentrated nitric acid from pipe 28, into pipe 11.

The bottom fraction in the rectfying column consists of the weaker nitric acid of about 70–80% strength which is led off through pipe 24 to be combined with the dilute nitric acid from pipe 18, after which it is led through pipes 25 and 27 into pipe 14 and so back into cycle. The water of reaction formed in nitration is removed from the system at 26 in the form of very dilute nitric acid.

The process in the operational form according to FIG. 2 is also suitable for nitration processes in which the substance for nitration and/or the nitration product in the nitration mixture are soluble but not volatile in the evaporator $b$.

Figure 3:
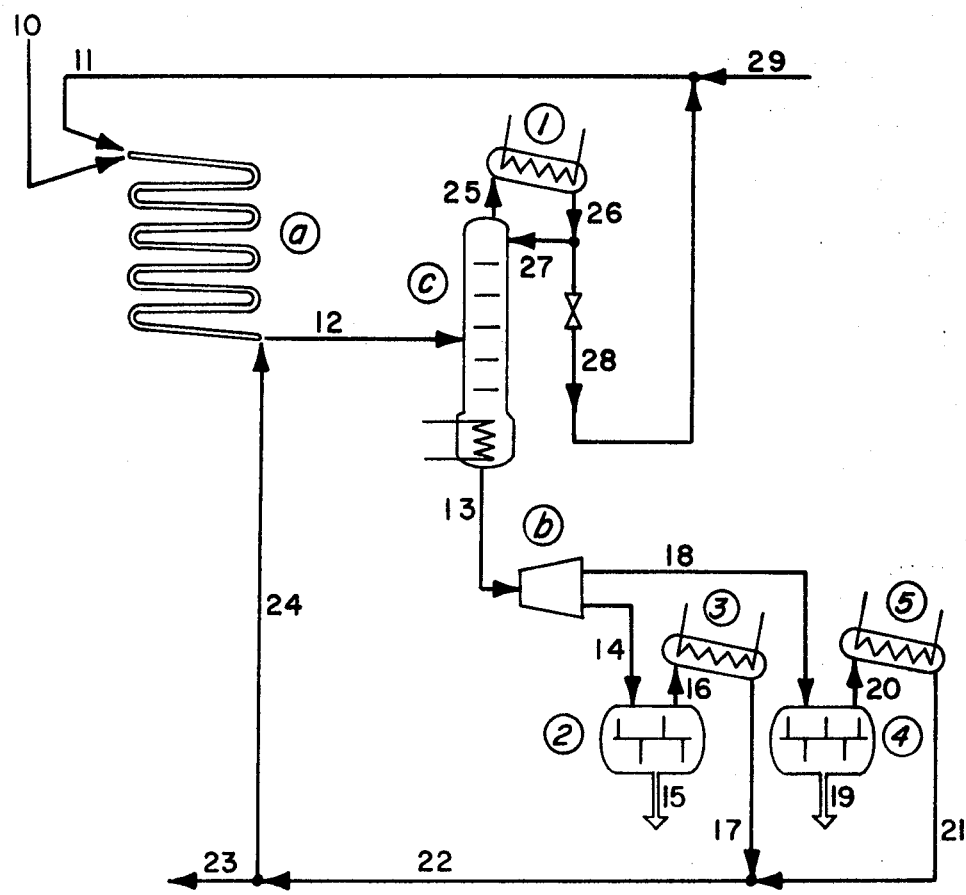
FIG. 3 is a diagrammatic representation of a second apparatus for performing the invention.

Referring now to FIG. 3 of the drawings, anthraquinone and concentrated nitric acid (preferably in the quantitative ratio given above) are fed into a reactor tube $a$ through pipes 10 and 11 respectively, such that there is a flow equivalent to a minimum Reynolds number of 2300. Before the reaction mixture is conducted through the pipe 12 into a rectifying column $c$, dilute nitric acid is added from the pipe 24. The reaction mixture is separated into two fractions in the rectifying column $c$, which is maintained preferably under reduced pressure. The top fraction consisting of concentrated nitric acid is led off through the pipe 25, the condenser 1 and pipes 26 and 28 to be combined with fresh highly concentrated nitric acid from pipe 29. It is then returned for reaction through pipe 11. A part of the concentrated nitric acid is run through pipe 27 to be used for refluxing in the rectifying column $c$. The bottom fraction consisting of dilute nitric acid and the nitration product is led through pipe 13 into a separating unit $b$, which may be a centrifuge or an evaporator (preferably a centrifuge), where the solid (reaction product) is separated from the liquid (dilute nitric acid). The solid product is led through pipe 14 into a thin-layered drier 2, from which the dry nitration product is removed through 15. Dilute, vaporous nitric acid is conducted through pipe 16 into a condenser 3 and returned through pipe 17 to the cycle. The liquid product left in unit $b$ consists predominantly of dilute nitric acid and is conveyed through the pipe 18 into the thin-layer drier 4, where further nitration product is isolated and removed at 19.

The dilute, evaporating nitric acid is conducted through pipe 20 into a condenser 5, where, after condensation, it is returned to the cycle via pipe 21. The dilute nitric acid from pipes 17 and 21 is reconveyed to the reaction mixture through pipes 22 and 24. The water of reaction formed in nitration is removed from the system through the pipe 23.

A variant of the process consists in conducting the dilute nitric acid, in the system shown in FIG. 2, directly into the evaporator $b$, and, in the system shown in FIG. 3, directly into the rectifying column $c$. In other words, the reaction mixture is not diluted with the recycle acid until it reaches the evaporation zone.

Figure 4:
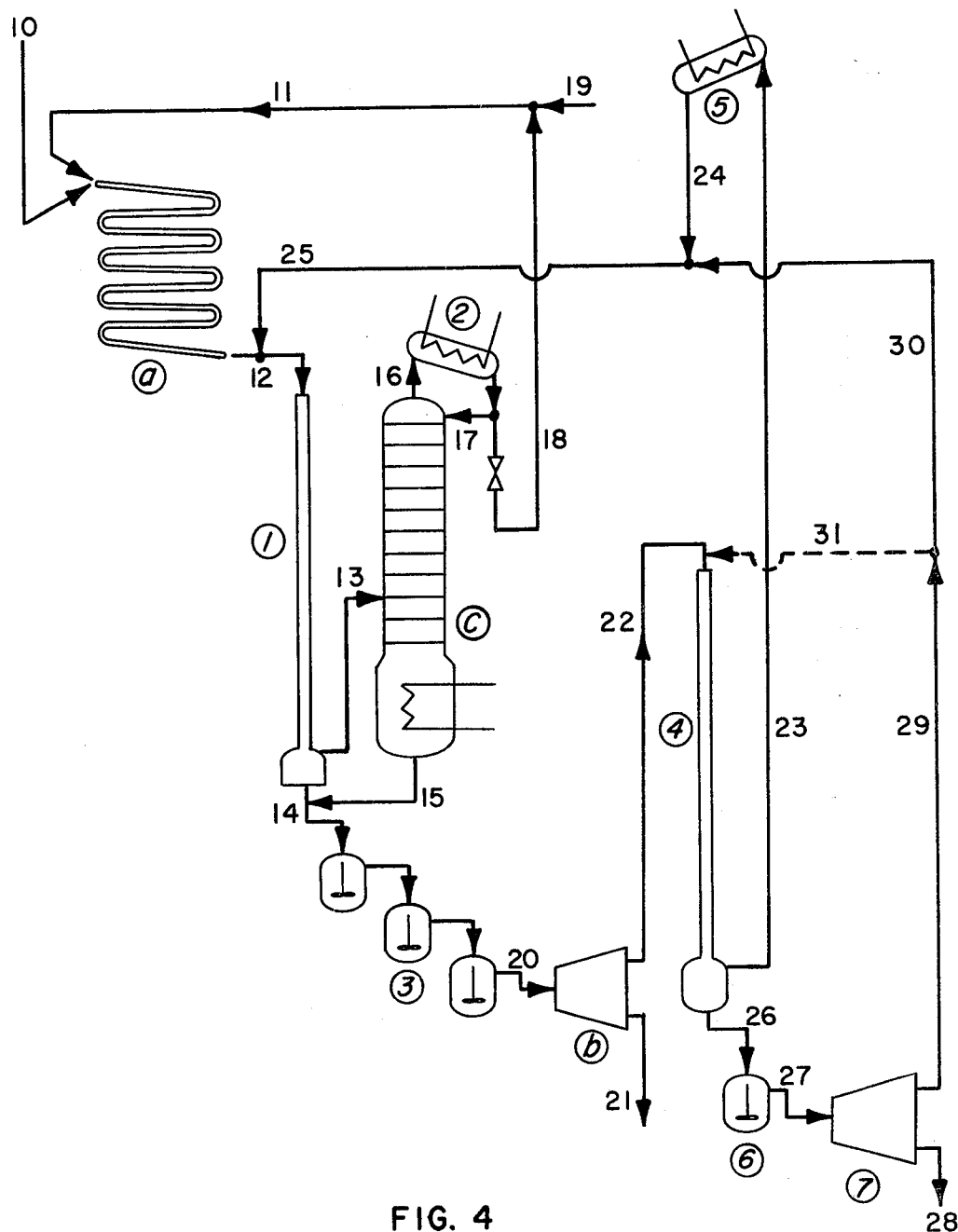
FIG. 4 is a diagrammatic representation of a third apparatus for performing the invention.

Referring now to FIG. 4 the apparatus illustrated therein comprises three units.

(a) a nitration unit $a$,
(b) a separating unit comprising connected elements 3, $b$, 4, 5, 6 and 7, and
(c) a rectifying unit comprising connected elements 1, $c$ and 2.

Anthraquinone for nitration is fed through pipe 10 into the reactor tube $a$ and the amount of concentrated nitric acid required for nitration is admitted through pipe 11 so that the flow in the cylinder corresponds to a Reynolds number of at least 2300. Nitration takes place largely in the reactor tube and may be conducted both as an adiabatic and isothermal reaction, or with only partial removal of heat of reaction.

From 25 dilute nitric acid is run into the nitration mixture as it flows through pipe 12. This reduces the rate of the reaction.

The dilute nitration mixture is conveyed from pipe 12, to descend through a falling film evaporator 1, in which concentrated nitric acid vapour is formed by heating and/or at reduced pressure. The vapour is conducted through 13 into the rectifying column $c$, where it is separated into a top and bottom fraction. The top fraction is condensed in a condenser 2 and conducted through 18 to 11, where it is mixed with fresh concentrated acid from 19. A part of the top fraction is directed back through 17 into the rectifying column for refluxing.

The nitration mixture remaining in the falling film evaporator after distillation of the concentrated nitric acid vapour is combined in 14 with the bottom fraction from 15 and conducted further through a cascade 3 to the centrifuge $b$. In the centrifuge $b$ solid 1-nitroanthraquinone is separated from the mother lye.

The solid 1-nitroanthraquinone is collected in the moist state in 21 and the mother lye directed through 22 to descend through a falling film evaporator 4. The The concentrated nitric acid vapour formed in 4 is led through 23 to a condenser 5, from which the dilute nitric acid is returned through 24 to 25. The mother lye remaining in 4 is led off through 26, the crystallization unit 6 and 27 to a centrifuge 7, where further solid nitration product (28) is separated. The filtrate is combined through 29 and 24 and returned as dilute acid through 25 to 12. Water of reaction is extracted from the system in the form of dilute acid and as moisture present in the filtercakes at 21 and 28.

A variation of the above system consists in fitting a branch pipe 31 leading from 29 to 22 so that pipe 30 can be partially or wholly excluded from the system. If this pipe section is completely sealed off, elements 4, 5 and 6 can be replaced by a crystallizer-evaporator unit conected to the centrifuge $b$ and 7.

In the above system of operation it is of advantage to operate the rectifying column $c$ under reduced pressure.

The invention will be further described in the following examples in which the parts and percentages are by weight and the temperatures in degrees centigrade. The quantities, unless otherwise stated, are the throughput per hour of operating time.

EXAMPLE 1

Referring to FIG. 2, 208 parts of anthraquinone and 2500 parts of 99% nitrict acid are fed into the reaction cascade $a$. After a total residence time of 25 minutes at 0–5°, 70% of the anthraquinone is nitrated. As it emerges from the cascade the reaction mixture is mixed with 7000 parts of 74% nitric acid from pipe 11, which gives a residual acid concentration of 80.5%. The mixture is conducted into the evaporator $b$, in which 7750 parts of 82% nitric acid are distilled. From the evaporator 1735 parts of 74% nitric acid and 245 parts of nitration product are directed into the thin-layer drier 2. From the drier 245 parts of the nitration product, containing about 60% 1-nitroanthraquinone, 32% anthraquinone and 8% of other nitroanthraquinone compounds are obtained. The 74% nitric acid distilled off is condensed in the condenser 3. The 82% nitric acid distilled in the evaporator $b$ is led into the rectifying column $c$, where 5300 parts of 74% nitric acid are obtained as bottom fraction. This acid is combined with the 1735 parts of 74% nitric acid from the condenser 3 and returned to the reaction solution. The excess of 74% nitric acid resulting from the water formed in the reaction (about 20–50 parts depending on the loss) is removed from the system through pipe 26. After condensation in the condenser 1, 2450 parts of 99% nitric acid are obtained from the rectifying column. This is mixed with about 50 parts of fresh acid and returned through the pipe 28 to the reaction vessel.

EXAMPLE 2

Referring to FIG. 3, 208 parts of anthraquinone and 2500 parts of 99% nitric acid are conducted at 0° into the reactor tube $a$ from pipes 10 and 11 respectively. The reaction is performed adiabatically. After 10 minutes the maximum concentration of 1-nitroanthraquinone (approximately 75% of anthraquinone compounds) is obtained, after which time the temperature reaches 35°, indicating the end-point of the reaction.

The reaction is broken off by running in 3000 parts of 78% nitric acid from pipe 24 which brings the concentration of the reaction mixture to 87%. The mixture is entered into the rectifying column c at one of the lower plates (the evaporation zone). From this level nitric acid of medium concentration ascends for further rectification to 99% nitric acid, while more dilute nitric acid descends to the reboiler in which a concentration of 78% nitric acid is maintained. At the head of the column vaporous, highly concentrated nitric acid escapes to be condensed to 99% nitric acid in the condenser 1. 2300 parts of 29% nitric acid are recovered and led back through pipe 28 for reaction. The difference of about 200 parts of nitric acid (consumption in the reaction and losses) is made good by adding fresh acid through pipe 29.

A suspension of 269 parts of crude nitroanthraquinone and a solution of 3150 parts of 78% nitric acid flow from the sump of the rectification column. In the centrifuge b, the precipitated nitroanthraquinone is separated and vacuum dried in the thin-layer drier 2 to free it from the adhering nitric acid. 181 parts of 1-nitroanthraquinone of 91% content is obtained, the remainder being dinitroanthraquinones. The mother lye from the centrifuge is evaporated in the second thin-layer drier 4 and the remaining solid product dried. 88 parts of 1-nitroanthraquinone of about 30% strength are obtained.

The vapours from the two thin-layer driers are condensed in the condensers 3 and 5 to give 78% acid. The amount of acid corresponding to the water of reaction and the acid losses (50–100 parts depending on the total loss) is removed from the system through the pipe 23, while the greater part of the condensed recycle acid is led through the pipe 24 to dilute the reaction mixture.

EXAMPLE 3

Referring to FIG. 4, 1180 parts of anthraquinone and 14,150 parts of 99% nitric acid are conducted at 0° into the reactor tube a through pipes 10 and 11 respectively. The reaction is performed adiabatically. After 10 minutes 95% of the anthraquinone has reacted. The final reaction temperature is 36°. At the end of the reactor tube the reaction is stopped by running in 17,400 parts of 78.5% nitric acid through pipe 25. A mixture containing nitric acid of 87.3% concentration is formed. It is conveyed through pipe 12 to a falling film evaporator 1, which forms part of the rectification equipment. At the end of the falling film evaporator 94% nitric acid vapour (16,200 parts) is led into the rectifying column 2 and separated there into 99% nitric acid vapour and 3,000 parts of 71% nitric acid. The 99% nitric acid is condensed in condenser 2, and from this condensed acid 13,000 parts are returned through the pipe 18 for reaction. The difference, 1,150 parts of nitric acid, is made good by directing fresh nitric acid into the cycle through pipe 19.

The 71% nitric acid flowing from the sump at about 120° passes through the pipe 15 to be combined at about 110° with the 1500 parts of 80% nitric acid containing the dissolved nitration products which flows from the falling film evaporator 1 through the pipe 14. The resulting mixture consists of 1430 parts of the nitration product of the anthraquinone and 18,000 parts of 78.5% nitric acid. It is conveyed into the crystallizing cascade 3, consisting of three externally cooled vessels with stirrers, where it is cooled to 20°, causing precipitation of 1015 parts of 91% 1-nitroanthraquinone. This is separated in the centrifuge b and removed in 21. The moist cake containing about 25% of 78.5% nitric acid is washed with water until neutral and conveyed, in the moist state, for further processing, e.g. reduction to 1-aminoanthraquinone. The mother lye in the centrifuge (17,600 parts of 78.5% nitric acid with about 600 parts of nitration product) is conducted through pipe 22 into a second falling film evaporator 4, where it is separated into 8200 parts of 85% nitric acid vapour, which is led through pipe 23 to condenser 5, and 9300 parts of 73% nitric acid containing nitroanthraquinone at 120°. The latter is conducted through the pipe 26 to the crystallizer 6 (an externally cooled vessel with stirrer), where it is cooled to 10°, on which 420 parts of crude nitroanthraquinone consisting of approximately equal amounts of 1-nitro-, 2-nitro- and dinitroanthraquinone settle out. This is separated in the centrifuge 7 as a crystalline slurry containing 25% of 73% nitric acid. The mother lye (9200 parts of 73% nitric acid, containing 1–2% anthraquinone products) is conveyed through pipes 29 and 30 to join with the 85% nitric acid flowing from the condenser 5 through the pipe 24.

What is claimed is:
1. In a process wherein pyrene, benzanthrone or anthraquinone is nitrated with an excess of concentrated nitric acid of at least 90% strength with the formation of water and the rate of reaction is subsequently reduced, the improvement which comprises the steps of (1) adding dilute nitric acid to effect the reduction in the rate of reaction and (2) fractionating the resulting residual acid solution into a concentrated nitric acid fraction and a dilute nitric acid fraction, the amounts of concentrated and dilute nitric acid used being such that the nitric acid concentration of the residual acid solution is greater than at the azeotropic point of said solution.

2. The process of claim 1, wherein the concentration of nitric acid in the dilute nitric acid is at least equal to that at the azeotropic point of the residual acid solution.

3. The process of Claim 2, wherein the dilute nitric acid has a concentration of from 70 to 80%.

4. The process of Claim 1, wherein the concentration of the concentrated nitric acid is at least 93%.

5. The process of Claim 4, wherein the concentration of the concentrated nitric acid is at least 97%.

6. A process according to Claim 1 wherein the nitration is effected at a temperature in the range of −10° to 60° C.

7. A process according to Claim 1 wherein the nitric acid concentration of the residual acid solution is maintained above 68%.

8. The process of Claim 1, wherein the nitric acid concentration of the residual acid solution is caused to lie in the range of from 75% to 90%.

9. A process according to Claim 8 wherein the nitration is carried out for a period of 10 to 30 minutes.

10. A process according to Claim 8 wherein the concentration of the dilute nitric acid is in the range 70% to 80%.

11. A process according to Claim 8 wherein the compound which is nitrated is anthraquinone.

12. A process according to Claim 11 wherein the mole ratio of concentrated nitric acid to anthraquinone is in the range 20:1 to 120:1.

13. A process according to Claim 11 wherein anthraquinone is nitrated at a temperature of −10 to 60° C. and dilute nitric acid of 70% to 80% concentration is added to the reaction mixture in amount sufficient to cause the nitric acid concentration of the residual acid solution to be in the range 75% to 90%.

14. The process of Claim 11, wherein anthraquinone is nitrated to yield mononitroanthraquinone.

15. The process of Claim 11 wherein the nitration is carried out continuously, the fractions of concentrated and dilute nitric acids being recycled, the former being used to nitrate further starting material, the latter to reduce the rate of nitration.

16. The process of Claim 15, wherein the concentration of nitric acid in the residual acid solution is maintained constant.

17. The process of Claim 16, wherein supplementary amounts of concentrated nitric acid, corresponding to amounts lost or used up in nitration, are added to the concentrated nitric acid cycle.

18. The process of Claim 17, wherein water, produced during nitration is removed in the form of dilute nitric acid.

19. A continuous process for the mono-nitration of anthraquinone comprising reacting anthraquinone with nitric acid of at least 90% concentration for a period of from 10 to 30 minutes and at a temperature of from −10° to +60° C., the mol ratio of said nitric acid to the anthraquinone lying in range of from 20:1 to 120:1, the rate of nitration being reduced after this period by addition of nitric acid of a concentration of from 70 to 80%, the amounts of concentrated and dilute acids being such that the concentration of nitric acid in the resulting residual acid solution is from 75% to 90%, said residual acid solution being fractionated to yield one fraction of nitric acid of concentration of at least 90% and a further fraction of nitric acid of concentration of from 70 to 80%, the former being used to nitrate further anthraquinone and the latter being used to reduce the rate of reaction of the nitration.

References Cited

Lubs, The Chemistry of Synthetic Dyes and Pigments, p. 350 (1955).

LORRAINE A. WEINBERGER, Primary Examiner

E. J. SKELLY, Assistant Examiner

U.S. Cl. X.R.

23—284; 260—364, 645, 688